(12) United States Patent
Stone et al.

(10) Patent No.: US 11,236,700 B2
(45) Date of Patent: Feb. 1, 2022

(54) THREE ACTUATOR CASCADE TYPE THRUST REVERSER ACTUATION SYSTEM

(71) Applicant: Woodward, Inc., Fort Collins, CO (US)

(72) Inventors: William Ernest Stone, Upland, CA (US); Joseph Thomas Kopecek, Santa Clarita, CA (US)

(73) Assignee: Woodward, Inc., Fort Collins, CO (US)

( * ) Notice: Subject to any disclaimer, the term of this patent is extended or adjusted under 35 U.S.C. 154(b) by 134 days.

(21) Appl. No.: 16/737,178

(22) Filed: Jan. 8, 2020

(65) Prior Publication Data

US 2021/0079872 A1    Mar. 18, 2021

Related U.S. Application Data

(62) Division of application No. 15/680,856, filed on Aug. 18, 2017, now Pat. No. 10,570,854.

(51) Int. Cl.
*F02K 1/76* (2006.01)
*F02K 1/72* (2006.01)
(Continued)

(52) U.S. Cl.
CPC .............. *F02K 1/763* (2013.01); *B64D 29/00* (2013.01); *B64D 29/08* (2013.01); *F02K 1/70* (2013.01);
(Continued)

(58) Field of Classification Search
CPC . F02K 1/763; F02K 1/766; F02K 1/72; F02K 1/60; F02K 1/605; B64D 29/06
See application file for complete search history.

(56) References Cited

U.S. PATENT DOCUMENTS

| | | | |
|---|---|---|---|
| 4,424,669 A | * | 1/1984 | Fage ...................... F02K 1/766 244/110 B |
| 6,592,074 B2 | | 7/2003 | Dehn et al. |

(Continued)

FOREIGN PATENT DOCUMENTS

EP    1222380    1/2015

OTHER PUBLICATIONS

International Search Report in International Application No. PCT/US2018/000356, dated Dec. 21, 2018, 16 pages.
(Continued)

*Primary Examiner* — Andrew H Nguyen
(74) *Attorney, Agent, or Firm* — Fish & Richardson P.C.

(57) ABSTRACT

The subject matter of this specification can be embodied in, among other things, a system includes a turbofan engine, a nacelle surrounding the engine and defining an annular bypass duct through the engine to define a generally forward-to-aft bypass air flow path, a thrust reverser movable to and from a reversing position where at least a portion of the bypass air flow path is reversed and comprising a first reverser portion having a first latch element, and a second reverser portion having a second latch element that is reversibly engageable with the first latch element to reversibly secure the second reverser portion to the first reverser portion, and an actuator comprising a catch element coupled to a portion of at least one of the first latch element and the second latch element to move the first reverser portion and the second reverser portion into and out of the reversing position.

13 Claims, 10 Drawing Sheets

(51) Int. Cl.
*B64D 29/06* (2006.01)
*B64D 29/08* (2006.01)
*F02K 1/70* (2006.01)
*B64D 29/00* (2006.01)
*F02K 3/02* (2006.01)
*F02C 7/04* (2006.01)

(52) U.S. Cl.
CPC ............... *F02K 1/72* (2013.01); *F02K 1/766* (2013.01); *F02K 3/02* (2013.01); *F02C 7/04* (2013.01); *F05D 2200/31* (2013.01); *F05D 2230/72* (2013.01)

(56) References Cited

U.S. PATENT DOCUMENTS

| | | |
|---|---|---|
| 8,955,306 B2 | 2/2015 | Maalioune et al. |
| 9,783,315 B2 | 10/2017 | James |
| 2013/0091825 A1* | 4/2013 | Joret ...................... B64D 29/06 60/226.2 |
| 2014/0234090 A1* | 8/2014 | Hurlin ................... B64D 29/06 415/182.1 |
| 2016/0053719 A1* | 2/2016 | Pretty ................... B64D 29/08 239/265.19 |
| 2019/0055902 A1 | 2/2019 | Stone |

OTHER PUBLICATIONS

International Preliminary Report on Patentability in International Application No. PT/US2018/000356, dated Feb. 27, 2020, 9 pages.

\* cited by examiner

THREE ACTUATOR CASCADE TYPE THRUST REVERSER ACTUATION SYSTEM

CROSS-REFERENCE TO RELATED PATENT APPLICATIONS

This application is a division of and claims the benefit of priority to U.S. patent application Ser. No. 15/680,856, filed Aug. 18, 2017, the contents of which are incorporated by reference herein.

TECHNICAL FIELD

This instant specification relates to an aircraft thrust reverser actuation system.

BACKGROUND

Contemporary aircraft engines may include a thrust reverse actuation system to assist in reducing the aircraft speed during landing. Typical thrust reversers include a movable transcowl that when in the active position reverses at least a portion of the airflow passing through the engine. To facilitate maintenance of areas of the engine, the moveable transcowl includes two moveable elements in a "clamshell" or "gull wing" arrangement that opens at the underside to give maintenance personnel access to the engine.

Conventional cascade type thrust reverser actuation systems have either four or six actuators per engine nacelle. The actuators are distributed so that each of the two moveable elements per nacelle has either two or three actuators, thus resulting in a symmetric arrangement of the actuators between the two translating cowls per nacelle. This arrangement allows for a relatively even distribution of the transcowl loads to the actuators.

SUMMARY

In general, this document describes a thrust reverser actuation system.

In a first aspect, a turbofan engine system includes a turbofan engine, a nacelle surrounding the turbofan engine and defining an annular bypass duct through the turbofan engine to define a generally forward-to-aft bypass air flow path, a thrust reverser movable to and from a reversing position where at least a portion of the bypass air flow path is reversed and comprising a first reverser portion having a first latch element, and a second reverser portion having a second latch element that is reversibly engageable with the first latch element to reversibly secure the second reverser portion to the first reverser portion, and an actuator comprising a catch element reversibly coupled to a portion of at least one of the first latch element and the second latch element to move the first reverser portion and the second reverser portion into and out of the reversing position.

Various embodiments can include some, all, or none of the following features. The turbofan engine system can also include a second actuator coupled to the first reverser portion to move the first reverser portion into and out of the reversing position, and a third actuator coupled to the second reverser portion to move the second reverser portion into and out of the reversing position. The actuator can be a fluid or electric actuator. The actuator can be a member of a collection of hydraulic or electric actuators configured to move the thrust reverser into and out of the reversing position, wherein the quantity of hydraulic or electric actuators in the collection is an odd number. The first reverser portion can include a first semi-tubular portion having the first latch element at a first circumferential end and a first hinge at a second circumferential end opposite the first circumferential end, the second reverser portion can include a second semi-tubular portion having the second latch element at a third circumferential end and a second hinge at a fourth circumferential end opposite the third circumferential end proximal to the first hinge, and the first semi-tubular portion and the second semi-tubular portion can form a generally tubular housing surrounding a portion of the turbofan engine when the first thrust reverser portion is secured to the second thrust reverser portion. The catch element can include at least a portion of a loop defining an interior space, the first latch element can include a first pin configured to fit within a portion of the interior space, the second latch element can include a second pin configured to fit within another portion of the interior space. The catch element can include a shaft having a first width and a head having a second width that is greater than the first width, the first latch element can define a first portion of an aperture configured to accommodate the shaft but not the head, the second latch element can define a second portion of the aperture.

In a second aspect, a method of thrust reversing includes coupling a first reverser portion of a thrust reverser having a first latch element to a second reverser portion of the thrust reverser having a second latch element, engaging, by the coupling, a portion of at least one of the first latch element and the second latch element to an actuator, such that the thrust reverser defines a portion of a generally forward-to-aft bypass air flow path through an annular bypass duct of a nacelle surrounding a turbofan engine, actuating the actuator to move the thrust reverser to a reversing position where at least a portion of the bypass air flow path is reversed.

Various implementations can include some, all, or none of the following features. The method can also include actuating the actuator to move the thrust reverser to a stowed position in which the thrust reverser defines the portion of the forward-to-aft bypass air flow path. The method can also include decoupling the first reverser portion from the second reverser portion, and disengaging, by the decoupling, the first latch element and the second latch element from the actuator. Decoupling the first reverser portion from the second reverser portion can include separating the first reverser portion from the second reverser portion such that the first latch element is spaced apart from the second latch element. Decoupling the first reverser portion from the second reverser portion can include pivoting first reverser portion about a first hinge at a first circumferential end of a first semi-tubular portion, opposite a second circumferential end having the first latch element, wherein the first reverser portion includes the first semi-tubular portion, and pivoting second reverser portion about a second hinge at a third circumferential end of a second semi-tubular portion, opposite a fourth circumferential end having the second latch element, wherein the second reverser portion includes the second semi-tubular portion, and the second hinge is proximal to the first hinge, separating the first latch portion from the second latch portion as the first reverser portion pivots about the first hinge and as the second reverser portion pivots about the second hinge. Coupling the first reverser portion to the second reverser portion can include moving the first reverser portion toward the second reverser portion such that the first latch element is proximal to the second latch element. Coupling the first reverser portion to the second reverser portion can include pivoting first reverser portion about a first hinge at a first circumferential end of a first semi-tubular portion, opposite a second circumferential end having the first latch element, wherein the first reverser portion includes the first semi-tubular portion, and pivoting second reverser portion about a second hinge at a third circumferential end of a second semi-tubular portion, opposite a fourth circumferential end having the second latch element, wherein the second reverser portion includes the second semi-tubular portion, and the second hinge is proximal to the first hinge, moving the first latch portion toward the second latch portion as the first reverser portion pivots about the first hinge and as the second reverser portion pivots about the second hinge.

In a third aspect, a thrust reverser apparatus includes a first turbofan engine thrust reverser portion movable to and from a reversing position and having a first latch element, and a second turbofan engine thrust reverser portion movable to and from the reversing position and having a second latch element that is reversibly engageable with the first latch element to reversibly secure the second reverser portion to the first reverser portion, and an actuator comprising a catch element reversibly coupled to a portion of at least one of the first latch element and the second latch element to move the first reverser portion and the second reverser portion into and out of the reversing position.

Various embodiments can include some, all, or none of the following features. The thrust reverser apparatus can also include a second actuator coupled to the first turbofan engine thrust reverser portion to move the first turbofan engine thrust reverser portion into and out of the reversing position, and a third actuator coupled to the second turbofan engine thrust reverser portion to move the second turbofan engine thrust reverser portion into and out of the reversing position. The actuator can be an electric or fluid actuator. The actuator can be a member of a collection of hydraulic or electric actuators configured to move the first turbofan engine thrust reverser portion and the second turbofan engine thrust reverser portion into and out of the reversing position, wherein the quantity of hydraulic or electric actuators in the collection is an odd number. The first turbofan engine thrust reverser portion can include a first semi-tubular portion having the first latch element at a first circumferential end, and a first hinge at a second circumferential end opposite the first circumferential end, the second turbofan engine thrust reverser portion can include a second semi-tubular portion having the second latch element at a third circumferential end, and a second hinge at a fourth circumferential end opposite the third circumferential end proximal to the first hinge, and the first semi-tubular portion and the second semi-tubular portion can form a generally tubular turbofan engine housing portion configured to surround a portion of a turbofan engine when the first turbofan engine thrust reverser portion is secured to the second turbofan engine thrust reverser portion. The catch element can include at least a portion of a loop defining an interior space, the first latch element can include a first pin configured to fit within a portion of the interior space, the second latch element can include a second pin configured to fit within a portion of the interior space. The catch element can include a shaft having a first width and a head having a second width that is greater than the first width, the first latch element can define a first portion of an aperture configured to accommodate the shaft but not the head, the second latch element can define a second portion of the aperture.

The systems and techniques described here may provide one or more of the following advantages. First, a system can provide up to about a ¼ weight savings compared to existing solutions. Second, the system can provide up to about a ¼ cost savings compared to existing solutions. Third, the system can be up to about ¼ less mechanically complex than existing solutions.

The details of one or more implementations are set forth in the accompanying drawings and the description below. Other features and advantages will be apparent from the description and drawings, and from the claims.

DETAILED DESCRIPTION

This document describes systems and techniques for reversing aircraft turbine engine airflow. A thrust reverser with at least one movable element, which is movable to and from a reversing position, may be used to change the direction of the bypass airflow. In the reversing position, the movable element may be configured to reverse at least a portion of the bypass airflow. Conventional cascade type thrust reverser actuation systems have either four or six actuators per engine nacelle (e.g., an even number of actuators). The actuators are distributed so that each of the two moveable elements per nacelle has either two or three actuators, thus resulting in a symmetric arrangement of the actuators between the two translating cowls per nacelle. This arrangement of an even number of actuators allows for a relatively even distribution of the transcowl loads to the actuators.

Each actuator, however, adds weight to the reverser actuation system. Substantial cost and weight savings can be obtained from reducing the number of actuators on a thrust reverser. The minimum number of actuators currently used is four per nacelle. A reduction to three actuators per nacelle, using conventional technology, would impose an asymmetric load upon the transcowls if a conventional installation is used. This document describes systems and techniques for reversing turbine engine airflow using three, or another odd number, of actuators. In general, a three-actuator arrangement can be accomplished by placing one actuator on each of the cowls, e.g., at the 10 o'clock and 2 o'clock positions. A third actuator is placed at the 6 o'clock position. A latching mechanism engages the left and the right transcowls to a piston (e.g., rod end) of the third (e.g., 6 o'clock) actuator. The transcowl loads will thus be distributed substantially evenly to the actuators, and the transcowls can be unlatched and opened in the typical gull-wing hinged arrangement for engine maintenance, as in conventional reverser arrangements.

Figure 1:
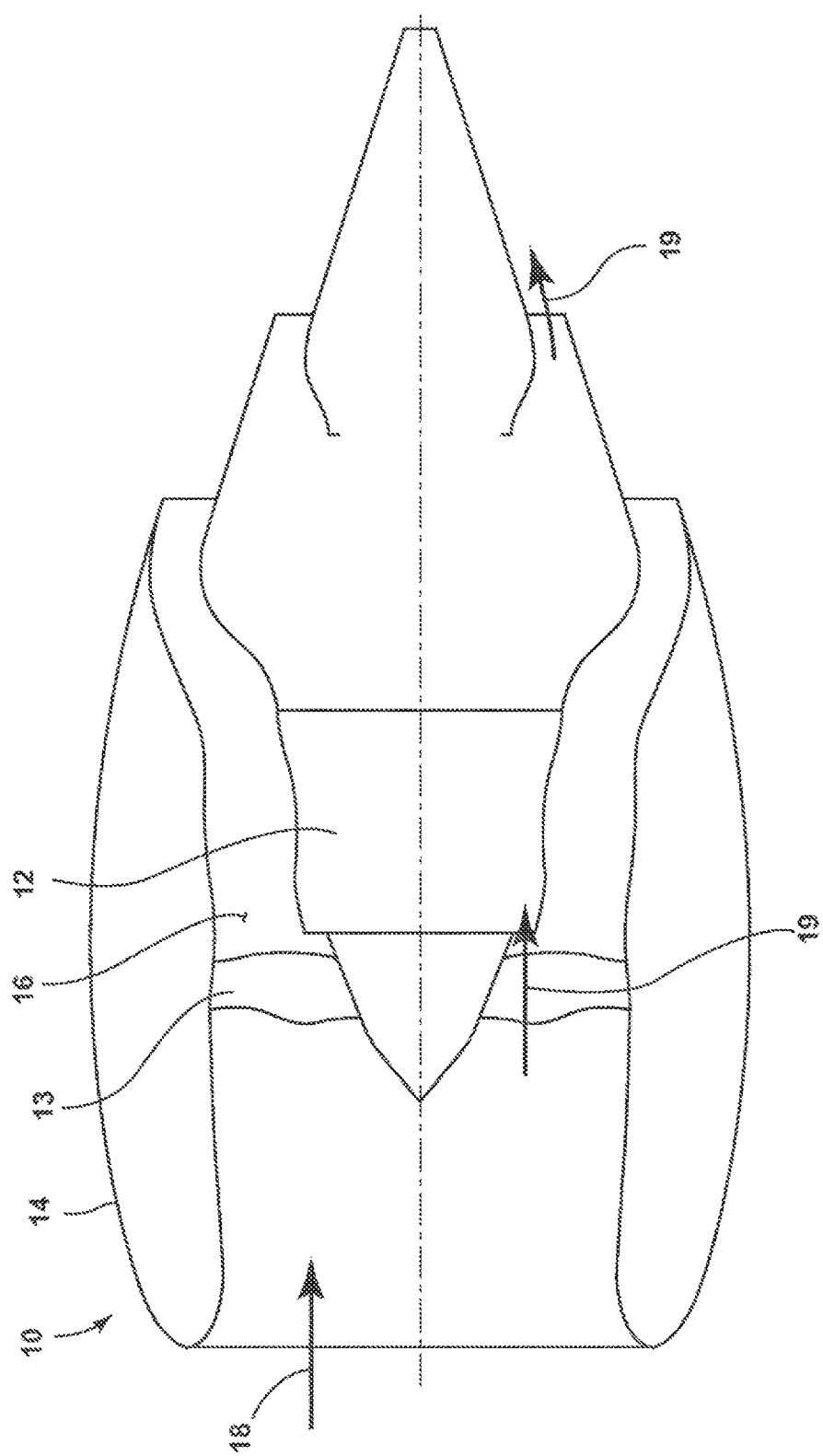
FIG. 1 is a schematic view of a turbofan jet engine with a portion of the outer nacelle cut away for clarity.

FIG. 1 illustrates an example turbofan jet engine assembly 10 having a turbine engine 12, a fan assembly 13, and a nacelle 14. Portions of the nacelle 14 have been cut away for clarity. The nacelle 14 surrounds the turbine engine 12 and defines an annular airflow path or annular bypass duct 16 through the jet engine assembly 10 to define a generally forward-to-aft bypass airflow path as schematically illustrated by the arrow 18. A combustion airflow is schematically illustrated by the arrows 19.

Figure 2:
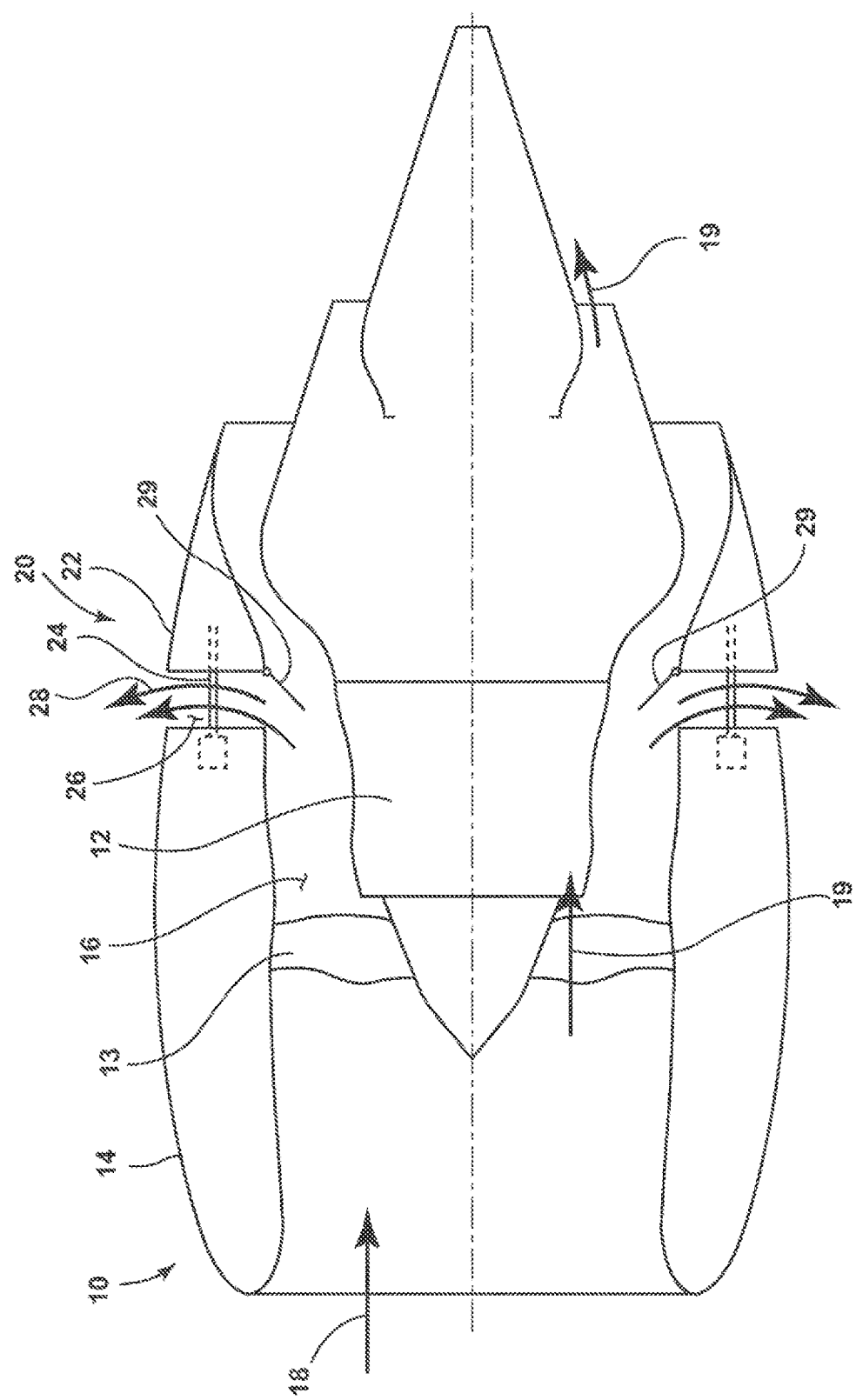
FIG. 2 is a schematic view of the engine of FIG. 1 with an exemplary thrust reverser.

A thrust reverser with at least one movable element, which is movable to and from a reversing position, may be used to change the direction of the bypass airflow. In the reversing position, the movable element may be configured to reverse at least a portion of the bypass airflow. There are several methods of obtaining reverse thrust on turbofan jet engine assemblies. FIG. 2 schematically illustrates one example of a thrust reverser 20 that may be used in the turbofan jet engine assembly 10. The thrust reverser 20 includes a movable element 22. The movable element 22 has been illustrated as a cowl portion that is capable of axial motion with respect to the forward portion of the nacelle 14. A hydraulic actuator 24 may be coupled to the movable element 22 to move the movable element 22 into and out of the reversing position. In the reversing position, as illustrated, the movable element 22 limits the annular bypass area between the movable element 22 and the turbine engine 12, it also opens up a portion 26 between the movable element 22 and the forward portion of the nacelle 14 such that the air flow path may be reversed as illustrated by the arrows 28. An optional deflector or flap 29 may be included to aid in directing the airflow path between the movable element 22 and the forward portion of the nacelle 14.

Figure 3:
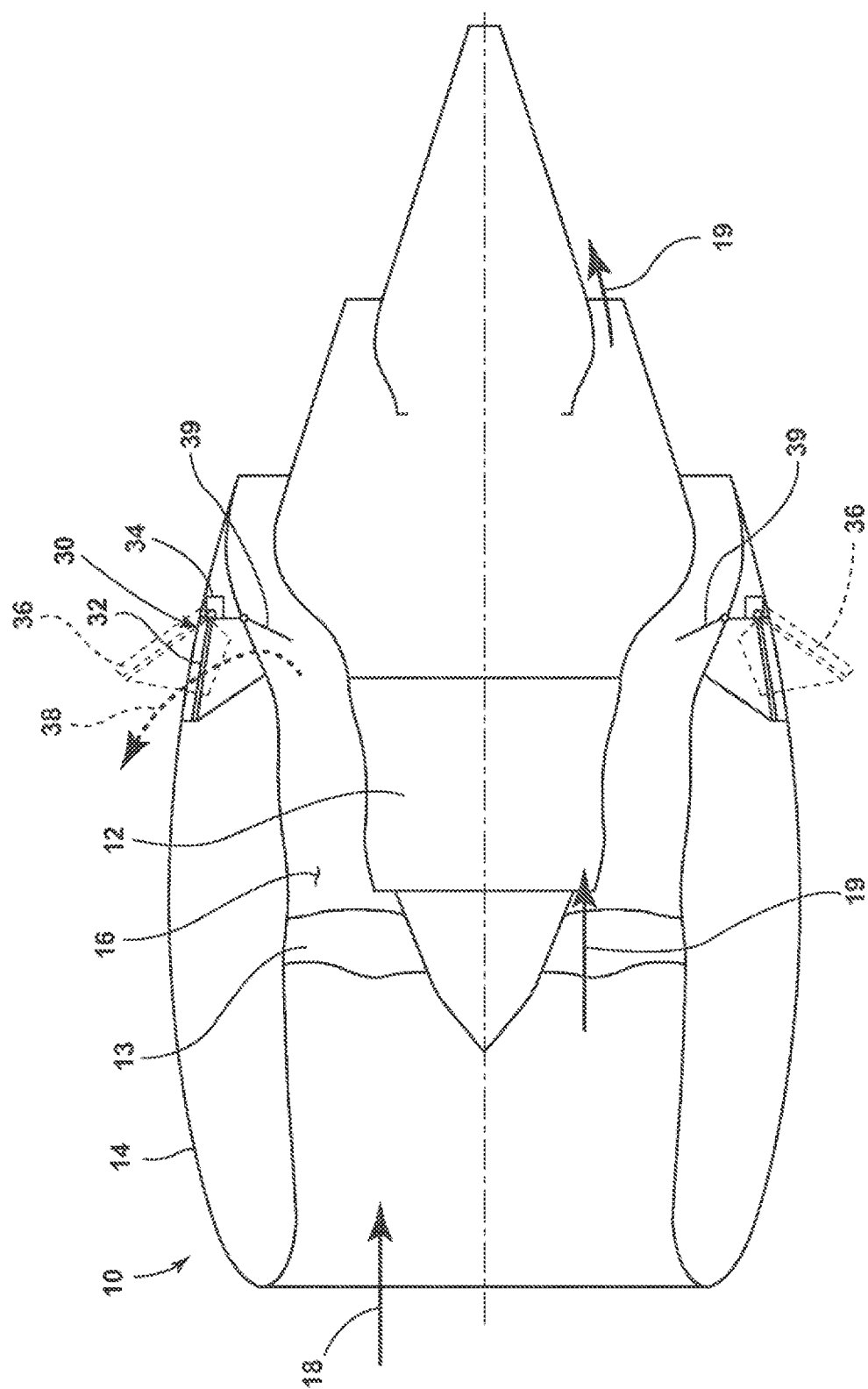
FIG. 3 is a schematic view of the engine of FIG. 1 with an alternative exemplary thrust reverser.

FIG. 3 schematically illustrates an alternative example of a thrust reverser 30. The thrust reverser 30 includes a movable element 32. The movable element 32 has been illustrated as a deflector, which may be built into a portion of the nacelle 14. A hydraulic actuator 34 may be coupled to the movable element 32 to move the movable element 32 into and out of the reversing position. In the reversing position, shown in phantom and indicated at 36, the movable element 32 turns that air outward and forward to reverse its direction as illustrated by the arrows 38. An optional deflector or flap 39 may be included to aid in directing the airflow path outward.

In both illustrative examples, the thrust reverser changes the direction of the thrust force. Both the thrust reverser 20 and the thrust reverser 30 have been described as hydraulically operated systems and a hydraulic actuator has been schematically illustrated. In some embodiments, the thrust reverser 20 and/or the thrust reverser 30 can be powered by other fluids (e.g., pneumatic), by electro-mechanical actuators, or by any other appropriate power source or actuator type.

Figure 4A:
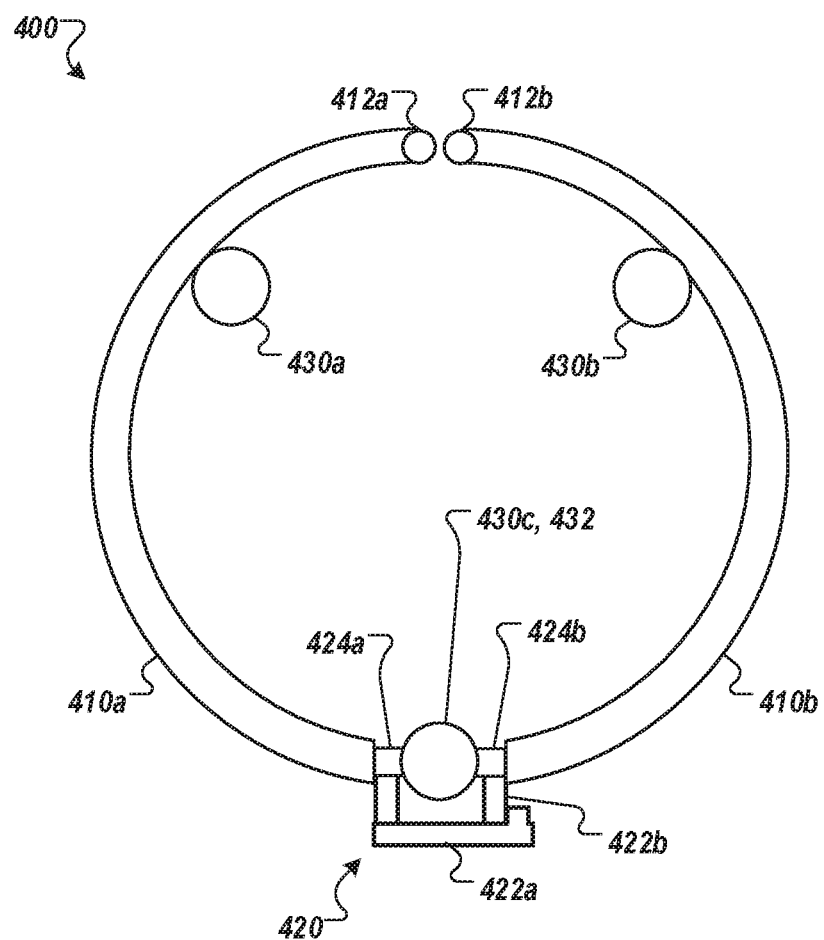
FIG. 4A is a schematic sectional view of an example thrust reverser in a closed configuration.

FIG. 4A is a schematic sectional view of an example thrust reverser 400 (e.g., for an aircraft turbine engine) in a closed configuration. For example, FIG. 4A can show an example of the thrust reverser 400 in condition for flight. In some embodiments, the thrust reverser 400 can be the example thrust reverser 20 of FIG. 2 or the example thrust reverser 30 of FIG. 3.

The thrust reverser 400 includes a moveable transcowl portion 410a and a moveable transcowl portion 410b. The moveable transcowl portion 410a is affixed to an aircraft wing, fuselage, or other structural member (not shown) at a hinge 412a. The moveable transcowl portion 410b is affixed to the aircraft wing, fuselage, or other structural member (not shown) at a hinge 412b. The moveable transcowl portion 410a includes a lock portion 422a of a thrust reverser latch 420, and the moveable transcowl portion 410b includes a lock portion 422b of the thrust reverser latch 420. The lock portion 422b is complementary to, and is configured to reversibly engage with, the lock portion 422a such that the moveable transcowl portion 410a is reversibly affixed to the moveable transcowl portion 410b by the thrust reverser latch 420.

The thrust reverser 400 includes a synchronized actuator 430a, a synchronized actuator 430b, and a synchronized actuator 430c. In some embodiments, one or more of the synchronized actuators 430a-430c can be hydraulic, pneumatic, or electromechanical linear actuators having one end affixed to the nacelle or other substantially stationary portion of the engine, and a moveable end (e.g., a piston rod end) that is directly or indirectly coupled to one or both of the moveable transcowl portions 410a or 410b. In some embodiments, a mechanical cable synchronization system can interconnect the synchronized actuators 430a-430c to transmit lock loads between opposite sides of the thrust reverser 400. The synchronized actuator 430a is located at approximately the 10 o'clock position (in the current view) of the thrust reverser 400, and is configured to provide actuation primarily to the moveable transcowl portion 410a. The synchronized actuator 430b is located at approximately the 2 o'clock position (in the current view) of the thrust reverser 400, and is configured to provide actuation primarily to the moveable transcowl portion 410b.

A third synchronized actuator 430c is located at approximately the six o'clock position (in the current view) of the thrust reverser 400. A latch element 424a is affixed to the moveable transcowl portion 410a and is configured to at least partly engage with a catch end 432 of the synchronized actuator 430c in the closed configuration. In some embodiments, the catch end 432 is a structure affixed to the moveable (e.g., free) end of the third synchronized actuator 430c. A latch element 424b is affixed to the moveable transcowl portion 410b and is configured to at least partly engage with the catch end 432 and the latch element 424a in the closed configuration. In the closed and latched configuration, the thrust reverser latch 420 engages the synchronized actuator 430c such that the synchronized actuator 430c is arranged to provide actuation to both the moveable transcowl portion 410a and the moveable transcowl portion 410b. With both of the latch elements 424a and 424b engaged with the catch end 432, the transcowl loads will be distributed substantially evenly to the synchronized actuators 430a-430c. The thrust reverser latch 420 and the synchronized actuator 430c will be discussed further in the descriptions of FIGS. 5A-5B.

Figure 4B:
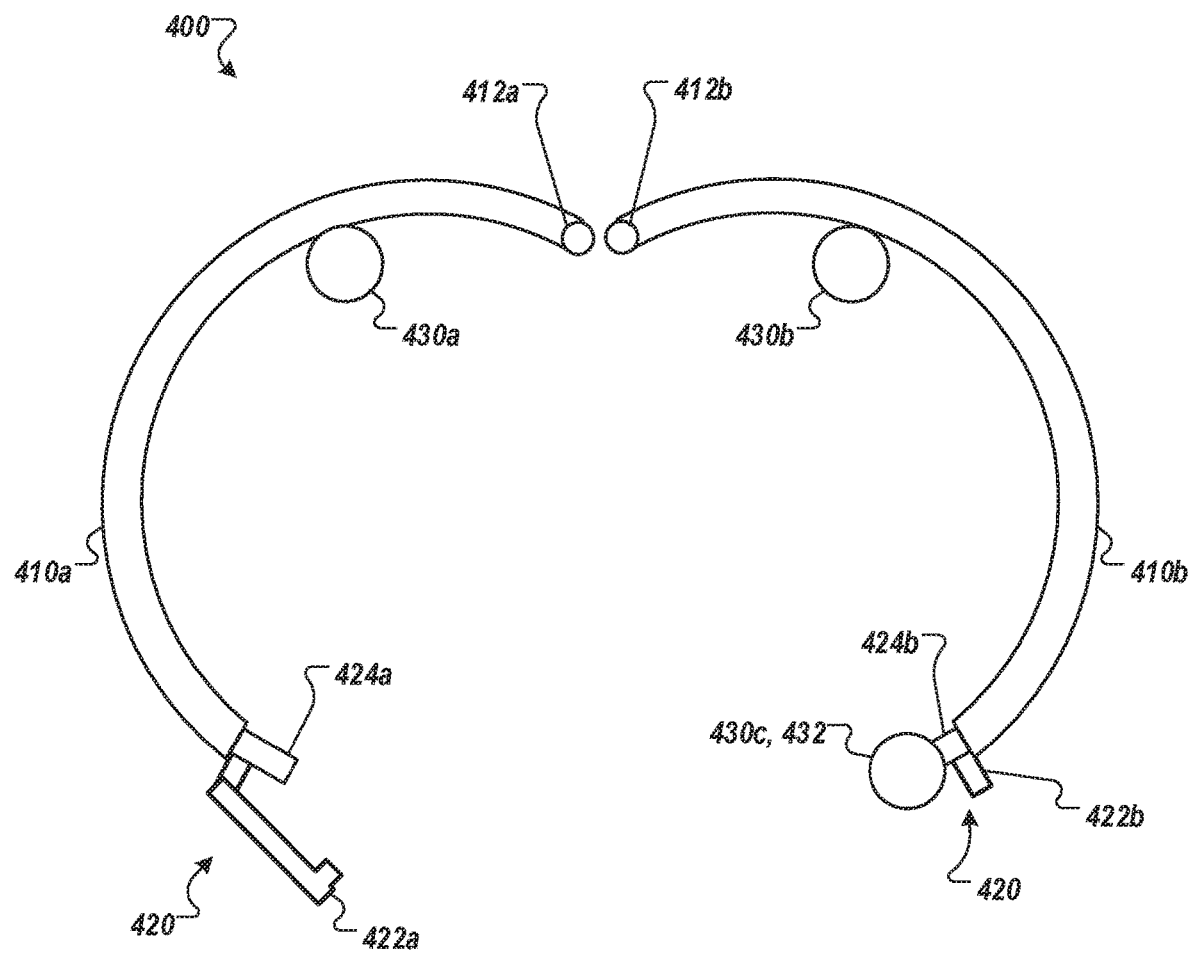
FIG. 4B is a schematic sectional view of the example thrust reverser of FIG. 4A in an open configuration.

FIG. 4B is a schematic sectional view of the example thrust reverser 400 of FIG. 4A in an open configuration. For example, FIG. 4B can show an example of the thrust reverser 400 in condition for maintenance. When transitioning from the closed configuration shown in FIG. 4A to the open configuration shown in FIG. 4B, the thrust reverser latch 420 is opened such that the first latch portion 422a is disengaged from the second latch portion 422b. The moveable transcowl portions 410a and 410b can then be pivoted on the hinges 412a, 412b to open the thrust reverser 400 in the typical gull-wing hinged arrangement for engine maintenance, as in conventional reverser arrangements.

The synchronized actuator 430c remains affixed to the moveable transcowl portion 410b and the latch element 424b remains at least partly engaged with the catch 432 in the open configuration, while the latch element 424a disengages from the catch end 432. In some embodiments, the synchronized actuator 430c can remain affixed to the moveable transcowl 410a in the open configuration instead, in which the latch element 424a remains at least partly engaged with the catch end 432 in the open configuration, while the latch element 424b disengages from the catch end 432.

Figure 5A:
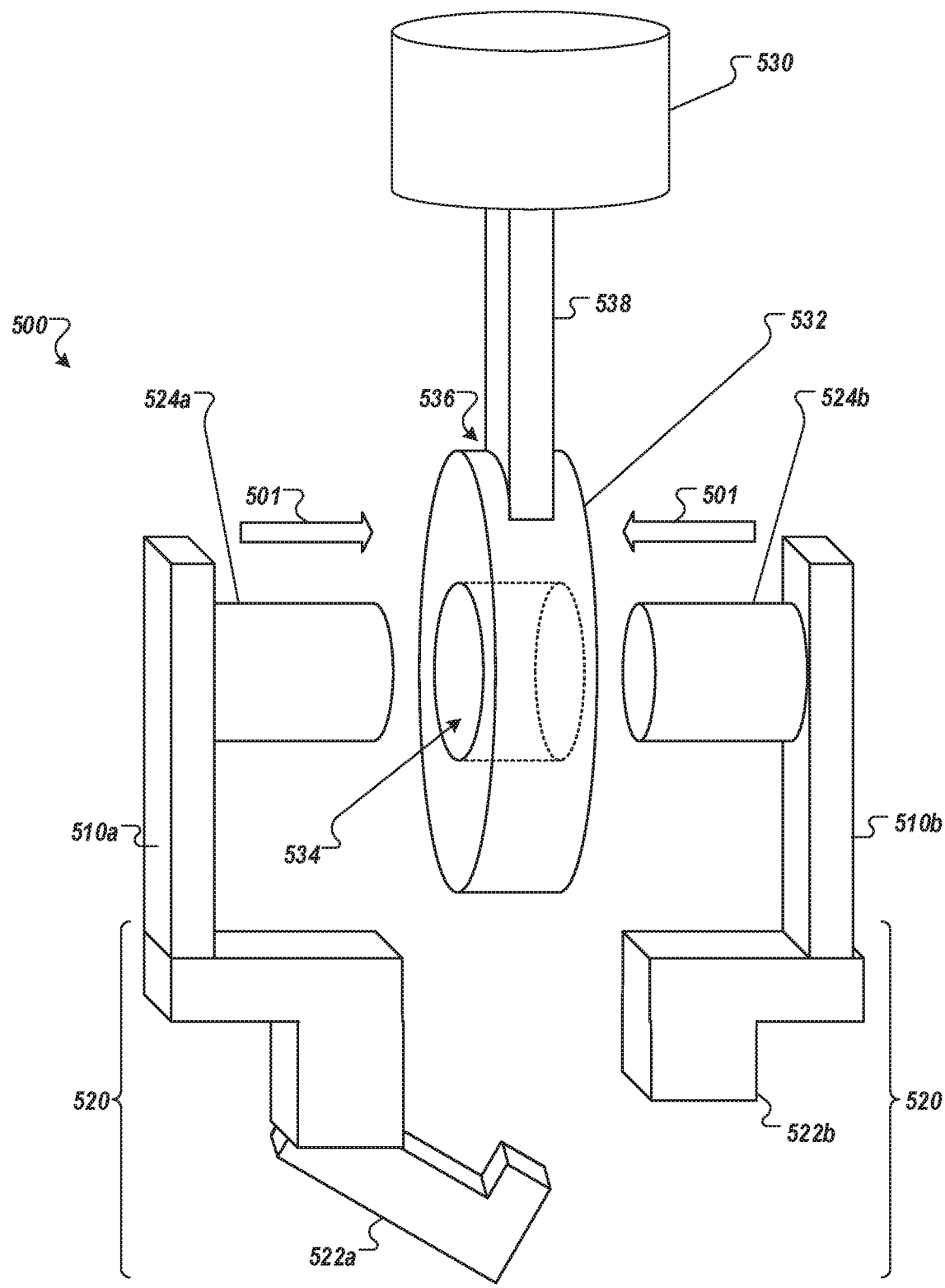
FIG. 5A is a perspective view of an example thrust reverser latch in an open configuration.
Figure 5B:
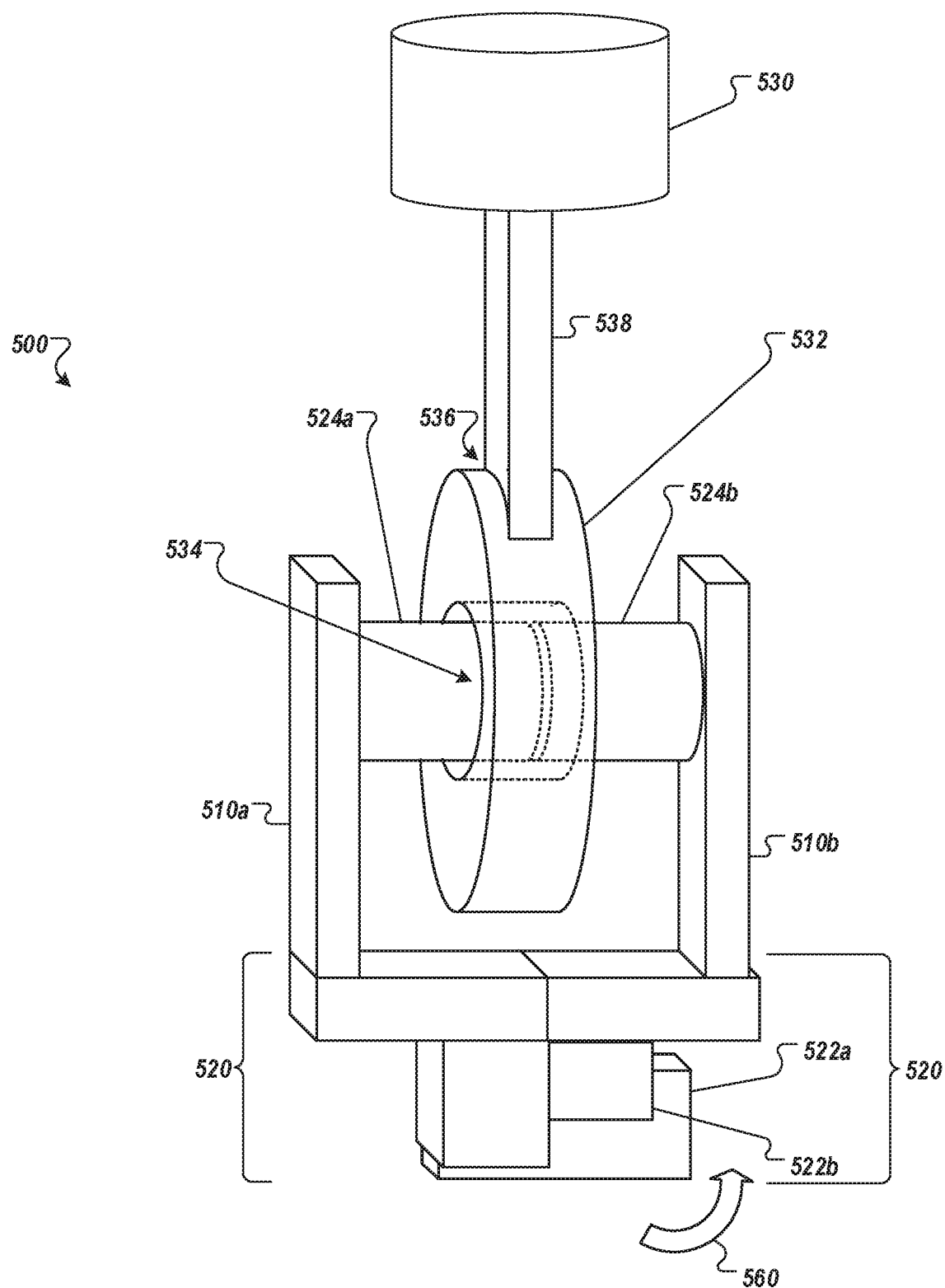
FIG. 5B is a perspective view of the example thrust reverser latch of FIG. 5A in a closed configuration.

FIG. 5A is a perspective view of an example thrust reverser latch 500 in an open configuration. FIG. 5B is a perspective view of the example thrust reverser latch of FIG. 5A in a closed configuration. In some embodiments, the thrust reverser latch 500 can be the example thrust reverser latch 420 of FIGS. 4A and 4B. For example, the thrust reverser latch 500 can be the example thrust reverser latch 420 in a configuration similar to that shown in FIG. 4B.

A moveable transcowl portion 510a includes a lock portion 522a of a lock 520 and a latch element 524a that projects outward from the moveable transcowl portion 510a. A moveable transcowl portion 510b includes a lock portion 522b of the lock 520 and a latch element 524b projects outward from the moveable transcowl portion 510b toward the latch element 524a. The lock portion 522b is complementary to, and is configured to reversibly engage with, the lock portion 522a such that the moveable transcowl portion 510a is reversibly affixed to the moveable transcowl portion 510b by the thrust reverser latch 500. For example, and as will be discussed further in the description of FIG. 5B, the lock portion 522a can be a hook, catch, latch arm, or other appropriate apparatus that is configured pivot to disengage (e.g., unhook, release) from the lock portion 522b (e.g., a tab, an eyelet, a slot), and the lock portion 522a can pivot or otherwise move to engage (e.g., capture, retain, hook) the lock portion 522b to prevent the moveable transcowl portion 510b from moving away from the transcowl portion 510a.

A catch end 532 (e.g., a catch element) is affixed to a distal end 536 of a moveable end 538 (e.g., piston rod) of the synchronized actuator 530. A bore 534 is defined within the catch end 532. In some embodiments, the catch element 532 forms at least a portion of a loop defining an interior space (e.g., the bore 534). The bore 534 is sized to receive and capture at least portions of the latch element 524a and the latch element 524b. In some embodiments, the latch element 524a can be formed as a first pin configured to fit within a portion of the interior space (e.g., the bore 534), and the latch element 524b can be formed as a second pin configured to fit within another portion of the interior space.

In operation, the thrust reverser latch 500 can be closed from the open configuration of FIG. 5A to the configuration of FIG. 5B by moving the moveable transcowl portion 510b toward the transcowl portion 510a, as represented by the arrows 501. For example, the example thrust reverser 400 can be closed from the open, gull-wing example configuration shown in FIG. 4B to the closed example configuration shown in FIG. 4A.

Referring primarily now to FIG. 5B, as the thrust reverser latch 500 closes, the latch element 524a affixed to the moveable transcowl portion 510a becomes partly inserted within the bore 534 defined within the catch end 532 (e.g., or otherwise reversibly engaged with the catch end 532), and the latch element 524b affixed to the moveable transcowl portion 510b becomes partly inserted within the bore 534 (e.g., or otherwise reversibly engaged with the catch end 532).

In the closed configuration, the catch end 532 captures or otherwise engages the moveable transcowl portions 510a and 510b through the latch elements 524a and 524b. The moveable end 538 may be extended and/or retracted (e.g., moved vertically in the illustrated example) by the synchronized actuator 530 to urge extension and/or retraction of the moveable transcowl portions 510a and 510b. Since the catch end 532 is engaged with both of the latch elements 524a and 524b, the forces provided by the synchronized actuator 530 are distributed in substantially balanced amounts to both the moveable transcowl portion 510a and the moveable transcowl portion 510b.

In some embodiments, one of the latch elements 524a and 524b may not disengage from the catch end 532. For example, the synchronized actuator 530, moveable end 538, and the catch end 532, may be affixed to either the transcowl portion 510b, such that when the thrust reverser changes from a closed configuration (e.g., FIG. 5B, FIG. 4A) to an open configuration (e.g., FIG. 5A, FIG. 4B), the latch element 524b may remain at least partly engaged with the catch end 532 while the latch element 524a is withdrawn from the bore 534, similar to the example configuration of the thrust reverser 400 as shown in FIG. 4B.

Once in the closed configuration, the lock portion 522a can be rotated, as indicated by arrow 560, from an unlocked configuration (e.g., as shown in FIG. 5A) into a locked configuration in which the lock portion 522a at least partly engages the lock portion 522b (e.g., as shown in FIG. 5B). With the lock portion 522a engaged with the lock portion 522b, the lock portion 522b and the transcowl portion 510b is prevented from moving away from the lock portion 522a and the transcowl portion 510a. In some embodiments, the lock 520 can be a manually operated mechanism. For example, the lock 520 can be mounted on the exterior of an engine nacelle such that maintenance personnel can disengage the lock 520 to allow the transcowl portions 510a and 510b to separate (e.g., gull-wing opening) to permit access to the engine, and then later close the transcowl portions 510a, 510b and re-engage the lock 520 to prevent separation of the transcowl portions 510a, 510b (e.g., during flight or other normal operations).

Figure 6:
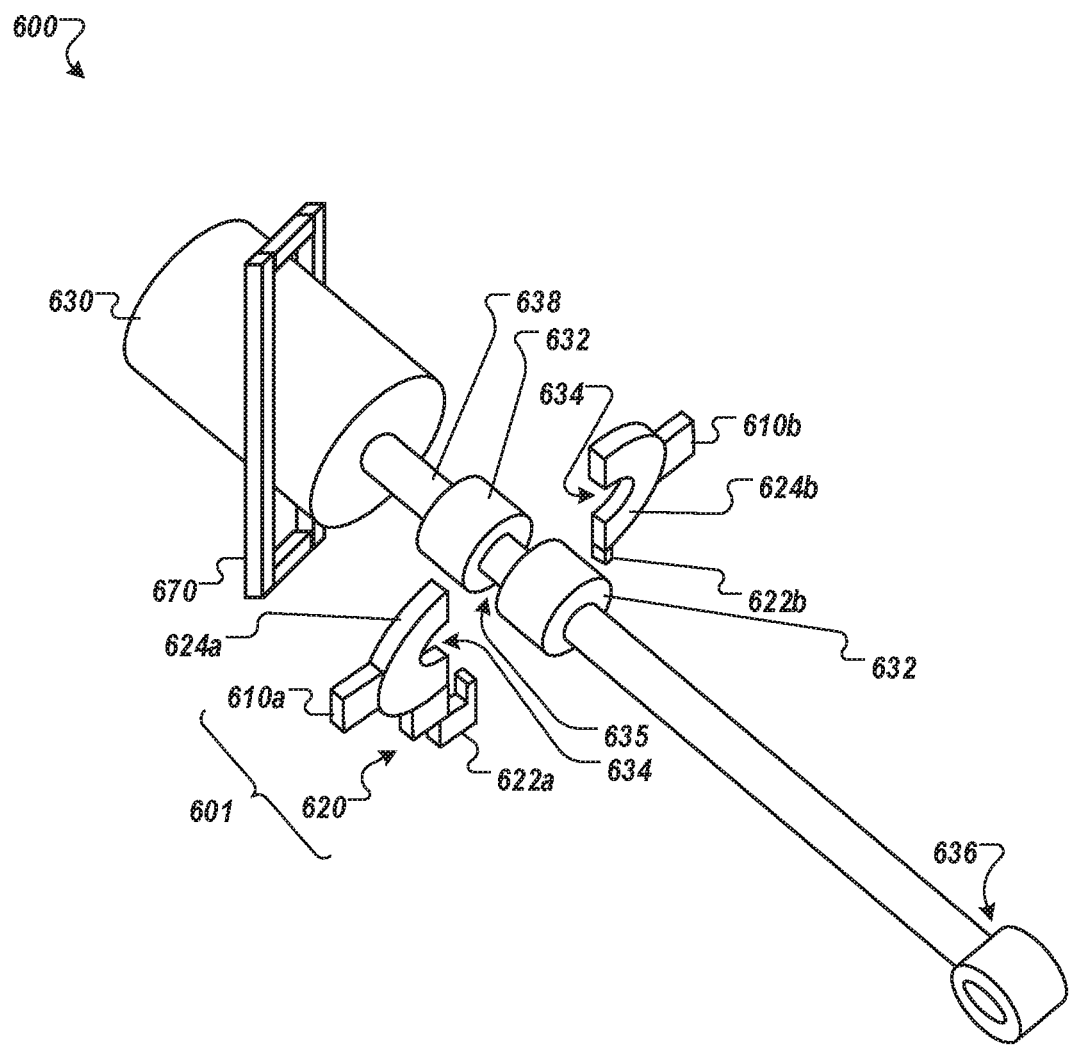
FIG. 6 is a perspective view of another example thrust reverser actuator.

FIG. 6 is a perspective view of another example thrust reverser actuator 600. In some embodiments, the thrust reverser actuator 500 can be used in place of the example thrust reverser latch 420 and synchronized actuator 430c of FIGS. 4A and 4B.

In general, the embodiments of FIGS. 4A-5B are configured have the synchronized actuator 430c or 530 remain stationary (e.g., mounted to the engine or other bulkhead structure) and have the catch 432 or 532 move with the moveable transcowl portions 410a and 410b or 510a and 510b. The thrust reverser actuator 600 differs from these embodiments in that a distal end 636 of a moveable end 538 is configured to be stationary (e.g., affixed to the engine or bulkhead structure) while a synchronized actuator 630 travels with a moveable transcowl (not shown in its entirety here). The synchronized actuator 630 is affixed to the moveable transcowl by a gimbal assembly 670. For example, the gimbal assembly 670 can allow the synchronized actuator 630 to comply (e.g., pitch and yaw) as the moveable transcowl is extended and retracted relative to the engine nacelle.

The thrust reverser 600 includes a thrust reverser latch 601. A moveable transcowl portion 610a includes a lock portion 622a of a lock 620 and a latch element 624a of the thrust reverser latch 601 that projects outward from the moveable transcowl portion 610a. A moveable transcowl portion 610b includes a lock portion 622b of the lock 620 and a latch element 624b of the thrust reverser latch 601 projects outward from the moveable transcowl portion 610b toward the latch element 624a. In the illustrated example, the latch elements 624a and 624b are formed as complimentary, approximately semicircular (e.g., half-circle) structures that when brought together define a bore 634. The bore 634 is configured to accommodate a moveable end 636 of the synchronized actuator 630.

The lock portion 622b is complementary to, and is configured to reversibly engage with, the lock portion 622a such that the moveable transcowl portion 610a is reversibly affixed to the moveable transcowl portion 610b by the thrust reverser latch 601. For example, the lock portion 622a can be a hook, catch, latch arm, or other appropriate apparatus that is configured to pivot to disengage (e.g., unhook, release) from the lock portion 622b (e.g., a tab, an eyelet, a slot), and the lock portion 622a can pivot or otherwise move to engage (e.g., capture, retain, hook) the lock portion 622b to prevent the moveable transcowl portion 610b from moving away from the transcowl portion 610a.

A catch end 632 is affixed along a moveable end 638 (e.g., piston rod, shaft) of the synchronized actuator 630. A groove 635 is defined within the catch end 632, such that the catch end 632 has a width that is greater than the width of the groove. The bore 634 is sized to receive and capture at least portions of the latch element 624a and the latch element 624b. For example, the latch element 624a can defines a first portion of an aperture (e.g., the bore 634) can be configured to accommodate a shaft (e.g., the moveable end 638) but not a head (e.g., the catch end 632), and the latch element 624b can define a second portion of the aperture.

In operation, the thrust reverser latch 601 can be closed from an open configuration (e.g., as shown) to a closed configuration by moving the moveable transcowl portion 610b toward the transcowl portion 610a. For example, the example thrust reverser 400 can be closed from the open, gull-wing example configuration shown in FIG. 4B to the closed example configuration shown in FIG. 4A.

As the thrust reverser latch 601 closes, the latch element 624a affixed to the moveable transcowl portion 610a becomes partly inserted within the groove 635 defined within the catch end 632 (e.g., or otherwise reversibly engaged with the catch end 632), and the latch element 624b affixed to the moveable transcowl portion 610b becomes partly inserted within the groove 635 (e.g., or otherwise reversibly engaged with the catch end 632). As such, the bore 634 substantially surrounds the moveable end 638 within the groove 635, and the latch elements 624a and 624b are reversibly affixed to the moveable end 638 such that the synchronized actuator 630 is configured to urge linear movement of the moveable transcowl portions 610a and 610b.

In the closed configuration, the catch end 632 reversibly engages the moveable transcowl portions 610a and 610b through the latch elements 624a and 624b. The moveable end 638 may be extended and/or retracted (e.g., moved diagonally in the illustrated example) by the synchronized actuator 630 to urge extension and/or retraction on the moveable transcowl portions 610a and 610b. Since the catch end 632 is engaged with both of the latch elements 624a and 624b, the forces provided by the synchronized actuator 630 are distributed in substantially balanced amounts to both the moveable transcowl portion 610a and the moveable transcowl portion 610b.

In some embodiments, one of the latch elements 624a or 624b may not disengage from the catch end 632. For example, the synchronized actuator 630 may be affixed to either the transcowl portion 610b, such that when the thrust reverser changes from a closed configuration (e.g., FIG. 5B, FIG. 4A) to an open configuration (e.g., FIG. 5A, FIG. 4B), the latch element 624b may remain at least partly engaged with the catch end 632 while the latch element 624a is withdrawn from the groove 635, similar to the example configuration of the thrust reverser 400 as shown in FIG. 4B.

Once in the closed configuration, the lock portion 622a can be rotated from an unlocked configuration (e.g., similar to the one shown in FIG. 5A) into a locked configuration in which the lock portion 622a at least partly engages the lock portion 622b (e.g., similar to the one shown in FIG. 5B). With the lock portion 622a engaged with the lock portion 622b, the lock portion 622b and the transcowl portion 610b is prevented from moving away from the lock portion 622a and the transcowl portion 610a. In some embodiments, the lock 620 can be a manually operated mechanism. For example, the lock 620 can be mounted on the exterior of an engine nacelle such that maintenance personnel can disengage the lock 620 to allow the transcowl portions 610a and 610b to separate (e.g., gull-wing opening) to permit access to the engine, and then later close the transcowl portions 610a, 610b and re-engage the lock 620 to prevent separation of the transcowl portions 610a, 610b (e.g., during flight or other normal operations).

Figure 7:
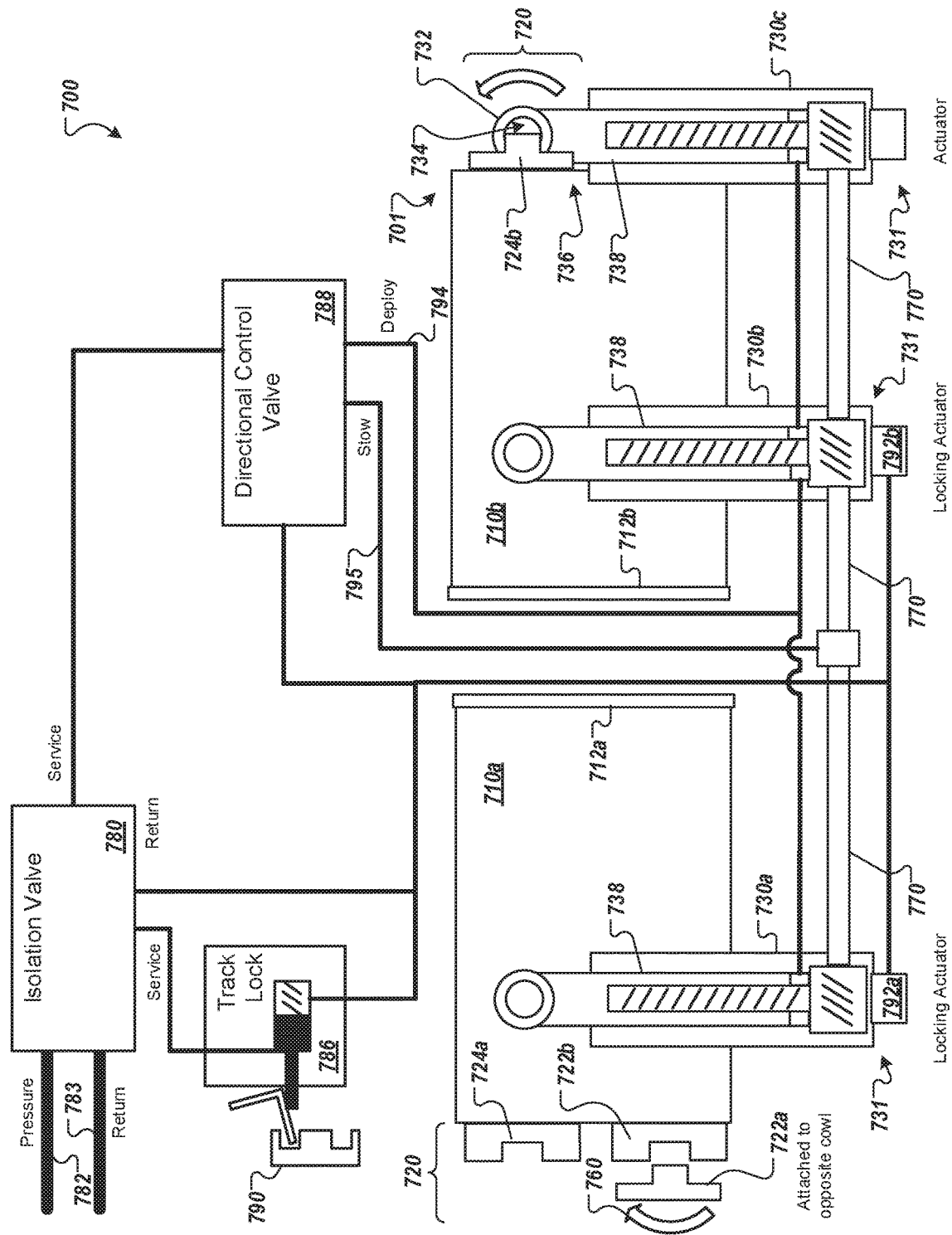
FIG. 7 is a schematic view of an example thrust reverser system.

FIG. 7 is a schematic view of an example thrust reverser system 700. In some embodiments, the thrust reverser system 700 can include some or all of the example thrust reverser 400 of FIGS. 4A and 4B, the example thrust reverser latch 500 of FIGS. 5A and 5B, and/or the example thrust reverser actuator 600 of FIG. 6. In some embodiments, the example turbofan jet engine assembly 10 of FIGS. 1-3 can include the example thrust reverser system 700.

A moveable transcowl portion 710a includes a lock portion 722a of a lock 720 and a latch element 724a that projects outward from the moveable transcowl portion 710a. A moveable transcowl portion 710b includes a lock portion 722b of the lock 720 and a latch element 724b projects outward from the moveable transcowl portion 710b toward the latch element 724a. In the illustrated example, the moveable transcowl portions 710a and 710b are show as being flat (e.g., planar) only for ease of viewing. In their intended form, the moveable transcowl portions 710a and 710b both have a semi-tubular (e.g., half-cylinder) shape, such that when brought together in a closed configuration the moveable transcowl portions 710a and 710b form a generally tubular, cylindrical, or conic section that can surround a portion of a turbine engine. For example, the moveable transcowl portions 710a and 710b can be the example moveable transcowl portions 410a and 410b of FIGS. 4A and 4B.

The lock portion 722b is complementary to, and is configured to reversibly engage with, the lock portion 722a such that the moveable transcowl portion 710a is reversibly affixed to the moveable transcowl portion 710b by a thrust reverser latch 701. For example, the lock portion 722a can be a hook, catch, latch arm, or other appropriate apparatus that is configured to pivot to disengage (e.g., unhook, release) from the lock portion 722b (e.g., a tab, an eyelet, a slot), and the lock portion 522a can pivot or otherwise move to engage (e.g., capture, retain, hook) the lock portion 722b to prevent the moveable transcowl portion 710b from moving away from the transcowl portion 710a.

The moveable transcowl portion 710a is affixed to an aircraft wing, fuselage, or other structural member (not shown) at a hinge 712a. The moveable transcowl portion 710b is affixed to the aircraft wing, fuselage, or other structural member (not shown) at a hinge 712b.

The thrust reverser system 700 includes a synchronized actuator 730a, a synchronized actuator 730b, and a synchronized actuator 730c. In some embodiments, one or more of the synchronized actuators 730a-730c can be hydraulic, pneumatic, electromechanical linear actuators having a proximal end 731 affixed to the nacelle or other substantially stationary portion of the engine, and a moveable end 738 (e.g., a piston rod end) that is directly or indirectly coupled to one or both of the moveable transcowl portions 710a or 710b. In some embodiments, a mechanical synchronization system 770 (e.g., a cable or shaft interlink) can interconnect the synchronized actuators 730a-730c to transmit lock loads between opposite sides of the thrust reverser system 700. The synchronized actuator 730a is configured to provide actuation primarily to the moveable transcowl portion 710a. The synchronized actuator 430b is configured to provide actuation primarily to the moveable transcowl portion 710b.

A latch element 724a is affixed to the moveable transcowl portion 710a and is configured to at least partly engage with a catch end 732 of the synchronized actuator 730c in the closed configuration. In some embodiments, the catch end 732 is a structure affixed to the moveable (e.g., free) end of the third synchronized actuator 730c. A latch element 724b is affixed to the moveable transcowl portion 710b and is configured to at least partly engage with the catch end 732 and the latch element 724a in the closed configuration. In the closed and latched configuration, the thrust reverser latch 720 engages the synchronized actuator 730c such that the synchronized actuator 730c is arranged to provide actuation to both the moveable transcowl portion 710a and the moveable transcowl portion 710b. With both of the latch elements 724a and 724b engaged with the catch end 732, the transcowl loads will be distributed substantially evenly to the synchronized actuators 730a-730c.

A catch end 732 is affixed to a distal end 736 of the moveable end 738 (e.g., piston rod) of the synchronized actuator 730c. A bore 734 is defined within the catch end 732. The bore 734 is sized to receive and capture at least portions of the latch element 724a and the latch element 724b.

In operation, the thrust reverser latch 701 can be closed from the open configuration (e.g., as shown in the example of FIG. 5A) to the closed configuration (e.g., as shown in the example of FIG. 5B) by moving the moveable transcowl portion 710b toward the transcowl portion 710a. For example, the example the moveable transcowl portions 710a and 710b can be closed from an open, gull-wing configuration such as the one shown in FIG. 4B to a closed configuration such as the one shown in FIG. 4A.

As the thrust reverser latch 701 closes, the latch element 724a affixed to the moveable transcowl portion 710a becomes partly inserted within the bore 734 defined within the catch end 732 (e.g., or otherwise reversibly engaged with the catch end 732), and the latch element 724b affixed to the moveable transcowl portion 710b becomes partly inserted within the bore 734 (e.g., or otherwise reversibly engaged with the catch end 732).

In the closed configuration, the catch end 732 captures or otherwise engages the moveable transcowl portions 710a and 710b through the latch elements 724a and 724b. The moveable end 738 may be extended and/or retracted (e.g., moved vertically in the illustrated example) by the synchronized actuator 730 to urge extension and/or retraction on the moveable transcowl portions 710a and 710b. Since the catch end 732 is engaged with both of the latch elements 724a and 724b, the forces provided by the synchronized actuator 730 are distributed in substantially balanced amounts to both the moveable transcowl portion 710a and the moveable transcowl portion 710b.

In some embodiments, one of the latch elements 724a and 724b may not disengage from the catch end 732. For example, the synchronized actuator 730, moveable end 738, and the catch end 732, may be affixed to either the transcowl portion 710b, such that when the thrust reverser changes from a closed configuration (e.g., FIG. 5B, FIG. 4A) to an open configuration (e.g., FIG. 5A, FIG. 4B), the latch element 724b may remain at least partly engaged with the catch end 732 while the latch element 724a is withdrawn from the bore 734, similar to the example configuration of the thrust reverser 400 as shown in FIG. 4B.

Once in the closed configuration, the lock portion 722a can be rotated, as indicated by arrow 760, from an unlocked configuration into a locked configuration in which the lock portion 722a at least partly engages the lock portion. With the lock portion 722a engaged with the lock portion 722b, the lock portion 722b and the transcowl portion 710b is prevented from moving away from the lock portion 722a and the transcowl portion 710a. In some embodiments, the lock 720 can be a manually operated mechanism. For example, the lock 720 can be mounted on the exterior of an engine nacelle such that maintenance personnel can disengage the lock 720 to allow the transcowl portions 710a and 710b to separate (e.g., gull-wing opening) to permit access to the engine, and then later close the transcowl portions 710a, 710b and re-engage the lock 720 to prevent separation of the transcowl portions 710a, 710b (e.g., during flight or other normal operations).

The moveable transcowl portions 710a and 710b are operated by controllably directing pressurized fluid (e.g., hydraulic fluid) to the synchronized actuators 730a-730c. Pressurized fluid is provided to an isolation valve 780 through a fluid conduit 782. Fluid is returned from the isolation valve 780 through a fluid conduit 783. The isolation valve 780 is operable to direct fluid flows to a track lock 786. As a slider 790 moves with the moveable transcowl portions 710a and 710b, the track lock 786 controllably permits and blocks the flow of fluid to a lock 792a and a lock 792b. The lock 792a is configured to controllably prevent and permit actuation of the synchronized actuator 730a, and the lock 792b is configured to controllably prevent and permit actuation of the synchronized actuator 730b.

The isolation valve 780 is also operable to direct fluid flows to a directional control valve 788. The directional control valve 788 is operable to direct fluid flows to the synchronized actuators 730a-730c to actuate the synchronized actuators 730a-730c and urge movement of the moveable transcowl portions 710a and 710b between a stowed configuration and a deployed configuration. For example, in one configuration of the directional control valve 788 pressurized fluid can be directed to flow to the synchronized actuators 730a-730c through a fluid conduit 794 and return through a fluid conduit 795 in order to deploy the moveable transcowl portions 710a and 710b, and in another configuration of the directional control valve 788 pressurized fluid can be directed to flow to the synchronized actuators 730a-730c through a fluid conduit 795 and return through a fluid conduit 794 in order to stow the moveable transcowl portions 710a and 710b.

Figure 8:
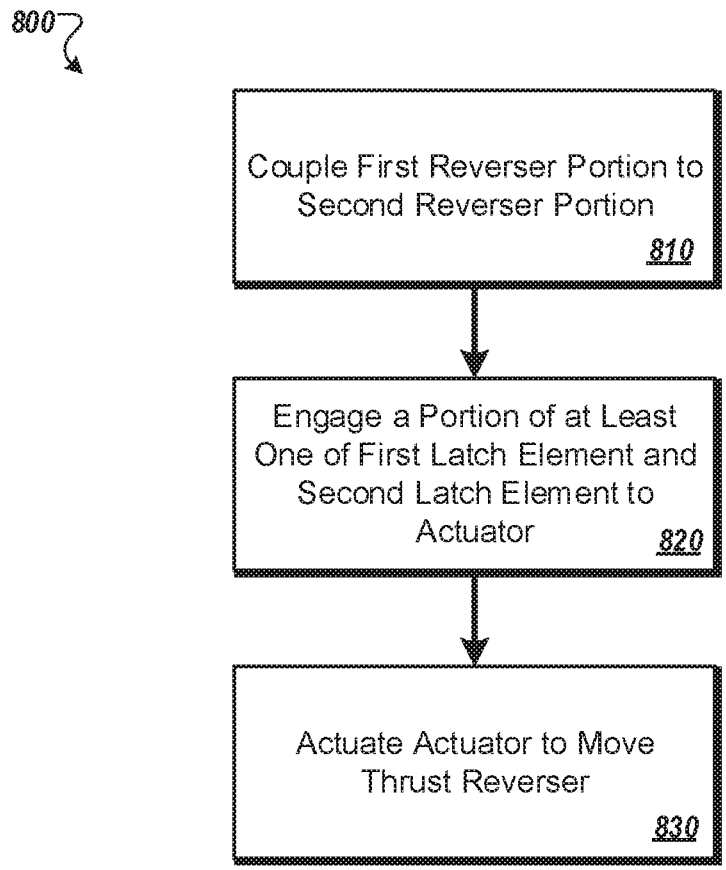
FIG. 8 is a flow diagram of an example process for using a thrust reverser.

FIG. 8 is a flow diagram of an example process 800 for using a thrust reverser. In some implementations, the process 800 can be used with the example turbofan jet engine assembly 10 of FIGS. 1-3, the example thrust reverser 20, the example thrust reverser 30, the example thrust reverser 400 of FIGS. 4A and 4B, the example thrust reverser latch 500 of FIGS. 5A and 5B, the example thrust reverser actuator 600 of FIG. 6, and/or the example thrust reverser system 700 of FIG. 7.

At 810, a first reverser portion of a thrust reverser having a first latch element is coupled to a second reverser portion of the thrust reverser having a second latch element. For example, the example the moveable transcowl portion 510a can be coupled to the moveable transcowl portion 510b though the latch element 524a and the latch element 524b.

At 820, a portion of at least one of the first latch element and the second latch element are engaged, by the coupling, to an actuator, such that the thrust reverser defines a portion of a generally forward-to-aft bypass airflow path through an annular bypass duct of a nacelle surrounding a turbofan engine. For example, thrust reverser 400 can be moved to the closed configuration shown in FIG. 4A from the open configuration shown in FIG. 4B. During such movement, the thrust reverser latch 500 can move from the open and disengaged configuration shown in FIG. 5A to the closed and engaged configuration shown in FIG. 5B. As shown in FIG. 5B the latch element 524a and the latch element 524b are partly inserted into the bore 534 and engage the synchronized actuator 530, and as shown in FIG. 4A, the thrust reverser 20, 30, and/or 400 form at least a portion of the annular bypass duct 16 of the nacelle 14 surrounding the turbofan engine 12.

In some implementations, coupling the first reverser portion to the second reverser portion can include moving the first reverser portion toward the second reverser portion such that the first latch element is proximal to the second latch element. In some implementations, coupling the first reverser portion to the second reverser portion can include pivoting first reverser portion about a first hinge at a first circumferential end of a first semi-tubular portion, opposite a second circumferential end having the first latch element, wherein the first reverser portion includes the first semi-tubular portion, and pivoting second reverser portion about a second hinge at a third circumferential end of a second semi-tubular portion, opposite a fourth circumferential end having the second latch element, wherein the second reverser portion includes the second semi-tubular portion, and the second hinge is proximal to the first hinge, moving the first latch portion toward the second latch portion as the first reverser portion pivots about the first hinge and as the second reverser portion pivots about the second hinge. For example the moveable transcowl portion 410a is configured to pivot on the hinge 412a, and the moveable transcowl portion 410b is configured to pivot on the hinge 412b, such that the thrust reverser 400 can close from a gull-wing configuration such as the one shown in FIG. 4B.

At 830, the actuator is actuated to move the thrust reverser to a reversing position where at least a portion of the bypass airflow path is reversed. For example, the synchronized actuator 430c (e.g., along with the synchronized actuators 430a and 430b) can be actuated to move the thrust reverser 400 into a reversing position such as the position of the thrust reverser 20 shown in FIG. 2.

In some implementations, the process 800 can also include actuating the actuator to move the thrust reverser to a stowed position in which the thrust reverser defines portion of the forward-to-aft bypass airflow path. For example, the synchronized actuator 430c (e.g., along with the synchronized actuators 430a and 430b) can be actuated to move the thrust reverser 400 into a stowed position to create a configuration such as the one shown in FIG. 1.

In some implementations, the process 800 can also include decoupling the first reverser portion from the second reverser portion, and disengaging, by the decoupling, the first latch element and the second latch element from the actuator. In some implementations, decoupling the first reverser portion from the second reverser portion can include separating the first reverser portion from the second reverser portion such that the first latch element is spaced apart from the second latch element. For example, the example thrust reverser latch 500 can be moved from the closed configuration shown in FIG. 5B to the open configuration of FIG. 5A, in which one or both of the latch elements 524a and 524b can be withdrawn or otherwise disengaged from the catch end 532 to decouple the transcowl portion 510a and/or 510b from the synchronized actuator 530.

In some implementations, decoupling the first reverser portion from the second reverser portion can include pivoting first reverser portion about a first hinge at a first circumferential end of a first semi-tubular portion, opposite a second circumferential end having the first latch element, wherein the first reverser portion includes the first semi-tubular portion, and pivoting second reverser portion about a second hinge at a third circumferential end of a second semi-tubular portion, opposite a fourth circumferential end having the second latch element, wherein the second reverser portion includes the second semi-tubular portion, and the second hinge is proximal to the first hinge, separating the first latch portion from the second latch portion as the first reverser portion pivots about the first hinge and as the second reverser portion pivots about the second hinge. For example the moveable transcowl portion 410a is configured to pivot on the hinge 412a, and the moveable transcowl portion 410b is configured to pivot on the hinge 412b, such that the thrust reverser 400 can open in a gull-wing configuration, e.g., to permit service access to an engine.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of thrust reversing comprising:
coupling a first transcowl portion having a first latch element, to a second transcowl portion having a second latch element configured to reversibly engage the first latch element, wherein the first transcowl portion and the second transcowl portions are components of a thrust reverser;
engaging, by the coupling, a portion of at least one of the first latch element and the second latch element to an actuator comprising a catch element reversibly coupled to a portion of at least one of the first latch element and the second latch element to move the first transcowl portion and the second transcowl portion, such that the thrust reverser defines a portion of a generally forward-to-aft bypass air flow path through an annular bypass duct of a nacelle surrounding a turbofan engine; and
actuating the actuator to move the thrust reverser to a reversing position where at least a portion of the bypass air flow path is reversed.

2. The method of claim 1, further comprising actuating the actuator to move the thrust reverser to a stowed position in which the thrust reverser defines the portion of the forward-to-aft bypass air flow path.

3. The method of claim 1, further comprising:
decoupling the first transcowl portion from the second transcowl portion; and
disengaging, by the decoupling, the first latch element and the second latch element from the actuator.

4. The method of claim 3, wherein decoupling the first transcowl portion from the second transcowl portion comprises separating the first transcowl portion from the second transcowl portion such that the first latch element is spaced apart from the second latch element.

5. The method of claim 3, wherein decoupling the first transcowl portion from the second transcowl portion comprises:
pivoting the first transcowl portion about a first hinge at a first circumferential end of a first semi-tubular portion, opposite a second circumferential end having the first latch element, wherein the first transcowl portion comprises the first semi-tubular portion;
pivoting the second transcowl portion about a second hinge at a third circumferential end of a second semi-tubular portion, opposite a fourth circumferential end having the second latch element, wherein the second transcowl portion comprises the second semi-tubular portion, and the second hinge is proximal to the first hinge; and
separating the first transcowl portion from the second transcowl portion as the first transcowl portion pivots about the first hinge and as the second transcowl portion pivots about the second hinge.

6. The method of claim 1, wherein coupling the first transcowl portion to the second transcowl portion comprises moving the first transcowl portion toward the second transcowl portion such that the first latch element is proximal to the second latch element.

7. The method of claim 1, wherein coupling the first transcowl portion to the second transcowl portion comprises:
pivoting the first transcowl portion about a first hinge at a first circumferential end of a first semi-tubular portion, opposite a second circumferential end having the first latch element, wherein the first transcowl portion comprises the first semi-tubular portion;
pivoting the second transcowl portion about a second hinge at a third circumferential end of a second semi-tubular portion, opposite a fourth circumferential end having the second latch element, wherein the second transcowl portion comprises the second semi-tubular portion, and the second hinge is proximal to the first hinge; and
moving the first transcowl portion toward the second transcowl portion as the first transcowl portion pivots about the first hinge and as the second transcowl portion pivots about the second hinge.

8. The method of claim 1, further comprising:
actuating a second actuator coupled to the first transcowl portion to move the thrust reverser to the reversing position; and
actuating a third actuator coupled to the second transcowl portion to move the thrust reverser to the reversing position.

9. The method of claim 1, wherein the actuator is a fluid or electric actuator.

10. The method of claim 1, wherein the actuator is a member of a collection of fluid or hydraulic actuators configured to move the thrust reverser into and out of the reversing position, wherein the quantity of fluid or hydraulic actuators in the collection is an odd number.

11. The method of claim 1, wherein:
the first transcowl portion comprises a first semi-tubular portion having the first latch element at a first circumferential end, and a first hinge at a second circumferential end opposite the first circumferential end;
the second transcowl portion comprises a second semi-tubular portion having the second latch element at a third circumferential end, and a second hinge at a fourth circumferential end opposite the third circumferential end proximal to the first hinge; and
the first semi-tubular portion and the second semi-tubular portion form a generally tubular housing surrounding a portion of the turbofan engine when the first transcowl portion is secured to the second transcowl portion.

12. The method of claim 1, wherein:
the catch element comprises at least a portion of a loop defining an interior space;
the first latch element comprises a first pin configured to fit within a portion of the interior space; and
the second latch element comprises a second pin configured to fit within another portion of the interior space.

13. The method of claim 1, wherein:
the catch element comprises a shaft having a first width and a head having a second width that is greater than the first width;
the first latch element defines a first portion of an aperture configured to accommodate the shaft but not the head; and
the second latch element defines a second portion of the aperture.

* * * * *